US007227444B2

(12) United States Patent
Fitzgibbon

(10) Patent No.: US 7,227,444 B2
(45) Date of Patent: Jun. 5, 2007

(54) METHOD AND APPARATUS FOR REMOTE CONTROL

(75) Inventor: James Fitzgibbon, Batavia, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 83 days.

(21) Appl. No.: 10/366,262

(22) Filed: Feb. 13, 2003

(65) Prior Publication Data

US 2004/0198251 A1 Oct. 7, 2004

(51) Int. Cl.

*G05B 19/00* (2006.01)
*G06F 7/00* (2006.01)
*G06K 19/00* (2006.01)
*H04B 1/00* (2006.01)
*H04L 9/14* (2006.01)

(52) U.S. Cl. .................. 340/5.24; 340/10.21; 340/5.7; 455/91

(58) Field of Classification Search ...... 340/5.21–5.27, 340/5.71, 5.72, 5.73, 5.8, 5.89, 825.69, 825.72, 340/825.22, 5.7; 701/36; 455/556.1, 151.2, 455/91, 41.1, 115.1; 348/734; 359/142
See application file for complete search history.

(56) References Cited

U.S. PATENT DOCUMENTS 5,109,222 A * 4/1992 Welty .................... 340/825.72
5,201,067 A * 4/1993 Grube et al. ............. 455/556.1
5,229,763 A * 7/1993 Nakamaru ............. 340/825.72
5,379,453 A * 1/1995 Tigwell ................... 455/151.2
5,519,457 A * 5/1996 Nishigaki et al. ........... 348/734
5,583,912 A * 12/1996 Schillaci et al. .............. 379/21
5,774,064 A * 6/1998 Lambropoulos et al. ..................... 340/825.69
5,864,297 A * 1/1999 Sollestre et al. ........... 340/5.23
6,008,735 A * 12/1999 Chiloyan et al. ...... 340/825.22
6,034,617 A * 3/2000 Luebke et al. ............. 340/5.62
6,188,326 B1 * 2/2001 Flick ...................... 340/825.69
6,204,796 B1 * 3/2001 Chan et al. ................. 341/176
6,696,972 B1 * 2/2004 Bryans .................. 340/825.72
6,718,240 B1 * 4/2004 Suda et al. .................... 701/36

FOREIGN PATENT DOCUMENTS

WO WO 99/50807 * 10/1999

* cited by examiner

*Primary Examiner*—Wendy R. Garber
*Assistant Examiner*—Nam Nguyen
(74) *Attorney, Agent, or Firm*—Fitch, Even, Tabin & Flannery

(57) ABSTRACT

An access requesting remote control device (10) includes an agile radio frequency transmitter (13) that will accommodate a variety of communication channels and modulation types. Programmable logic (11) controls the operation of the transmitter depending upon its programming. Such programming can be selectively varied as desired. In one embodiment, any of a plurality of pre-existing application programs can be selected in response to reception of a corresponding selection command via an external communication interface (14). In another embodiment, a relevant application program can be downloaded to the programmable logic via the external communication interface. In yet another embodiment, both options are available.

34 Claims, 2 Drawing Sheets

METHOD AND APPARATUS FOR REMOTE CONTROL

TECHNICAL FIELD

This invention relates generally to remote control devices and more particularly to remote control devices as are used to request access to a given location.

BACKGROUND

Various remotely controllable access control mechanisms are known, including movable barrier operators for movable barriers including, but not limited to, single and segmented garage doors, pivoting and sliding doors and cross-arms, rolling shutters, and the like. In general, each such system includes a primary barrier control mechanism. The latter couples in an appropriate way to a corresponding barrier and causes the barrier to move (typically between closed and opened positions).

In many cases, the primary barrier control mechanism will respond to appropriate access requesting signals from a wireless remote control device. At a minimum, these devices must interact compatibly using a common signal-bearing channel and modulation type, as well as a shared communication protocol. In addition, for many systems, the remote control device must further be able to provide (either automatically or upon request) identifying or other proof-of-authorization information to the primary barrier control mechanism.

Remote control devices as provided by the original manufacturer of the corresponding primary barrier control mechanism, of course, typically present no great issues in this regard. A consumer can be reasonably assured that, with little or no effort, the remote control device and/or the primary barrier control mechanism can be readily configured to co-operate successfully with one another.

With increasing frequency, however, such circumstances are not always present. For example, many automobiles are sold with a so-called universal integrated wireless remote control device (often mounted, for example, on the sun visor near the driver). Such devices typically include a variety of application programs and other data, parameters, and information that relate to compatible interoperability with a corresponding variety of makes of access control mechanisms. In such a case, the consumer who acquires the supplemental remote control device must take whatever steps are necessary to enable compatible operation via the universal integrated wireless remote control device.

Unfortunately, not all potential operators of such devices have the time, interest, patience, or other required wherewithal to assure appropriate configuration of such remote control devices. The training mechanism can differ with the make (or even model) of the access control device itself, thereby forcing the operator to need to ascertain which training mechanism to utilize to effect the desired configuration. Such problems are acerbated by the fact that such remote control devices typically have very minimal user interfaces (often only one or two push buttons, for example) and little or nothing in the way of visual or auditory feedback to the user (often only one or two small signal lights, for example).

Unfortunately, the growing ubiquity of such devices does not seem to urge any improvement in this situation. Just as, for so long, many people were reputed to own and use video cassette recorders that were never successfully programmed by their operator to display the correct time, so now there arguably appear to be many remote control devices that are either incorrectly programmed or not programmed at all.

BRIEF DESCRIPTION OF THE DRAWINGS

The above needs are at least partially met through provision of the method and apparatus for remote control described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, an access requesting remote control device includes a radio frequency transmitter, programmable logic, and an external communications interface. Depending upon the embodiment, the programmable logic can have access to a plurality of pre-existing application programs and or can receive a download (via, in a preferred embodiment, the external communications interface) of one or more such programs. In a preferred embodiment, the programmable logic can receive (also preferably via the external communications interface) a signaling input. Depending upon the embodiment, this signaling input can comprise a pre-existing application programming selection command signaling input and/or an application programming signaling input. When the signal comprises the pre-existing application programming selection command signaling input, the programmable logic selects at least part of at least one of the application programs as are currently available to the programmable logic. Thereafter, the selected program (or program portion) is used to control the operation of the remote control device. When the signal comprises the application programming signaling input, the programmable logic downloads the corresponding application programming information and thereafter uses that information to control the operation of the remote control device.

Depending upon the embodiment, the external communications interface can permit a wired or wireless coupling to a variety of platforms to permit use of a user-friendly user interface. If desired, the remote control device itself can be configured with a display to permit an easier and/or more intuitive way for the user to configure the remote control device.

Figure 1:
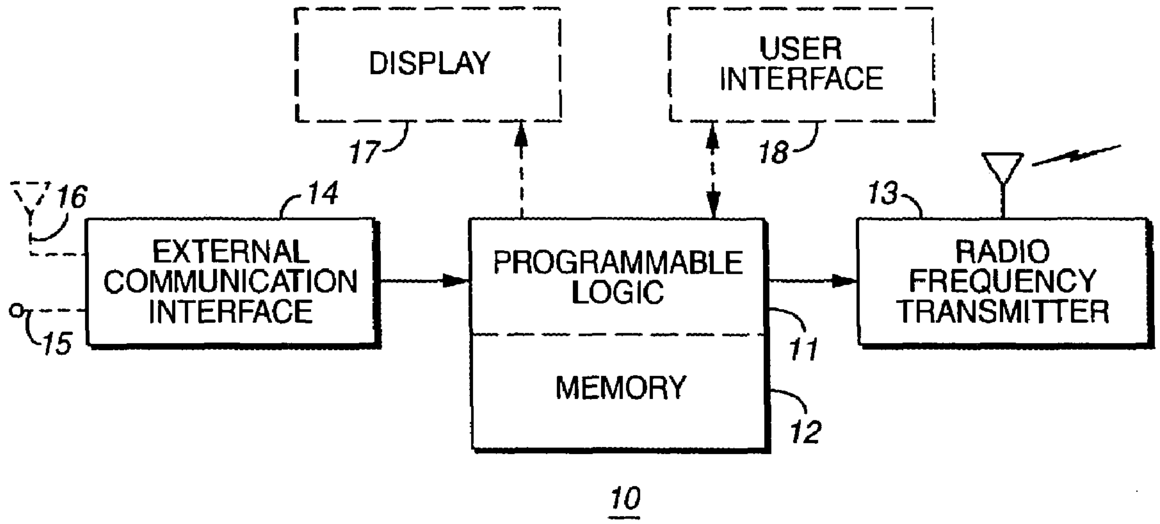
FIG. 1 comprises a block diagram of an access requesting remote control device as configured in accordance with an embodiment of the invention.

Referring now to FIG. 1, and according to a preferred embodiment, a remote control device 10 is comprised of programmable logic 11 (having either integral memory 12 as depicted and/or external memory (not shown) in accordance with well understand prior art practice), a radio frequency transmitter 13, and an external communications interface 14.

The programmable logic 11 can be any of a variety of integrated or distributed packages as are well known or hereafter developed. The programmable logic 11 has a signaling input that couples to an output of the external communications interface 14. Depending upon the embodiment, this signaling input can comprise either or both of a pre-existing application programming selection command signaling input or an application programming signaling input (and/or an access system authentication information input pursuant to other embodiments as described below). The programmable logic 11 also has a remote control signaling output that operably couples to an input of the radio frequency transmitter 13 to thereby control the operation of the transmitter.

The radio frequency transmitter 13 preferably comprises a relatively flexible and agile platform to thereby support compatible operation over a range of operational needs. For example, the transmitter is preferably operable at a variety of carrier frequencies and agile enough to utilize any of a plurality of modulation types. So configured, the transmitter 13 will support effective communications with a variety of primary barrier control mechanisms. Such transmitter platforms and the compatibility needs of such barrier control mechanisms are well known in the art, and hence further detail in this regard will not be presented here for the sake of brevity and the preservation of focus.

Figure 2:
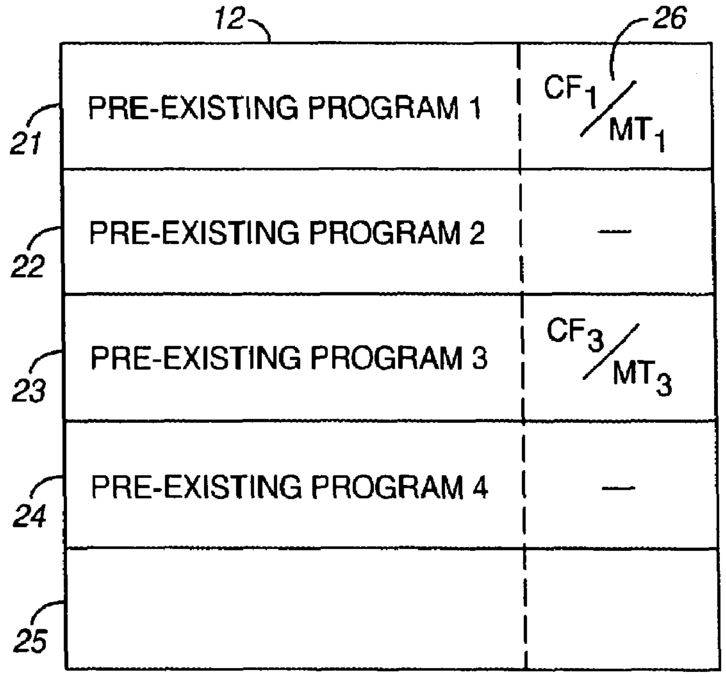
FIG. 2 comprises a schematic representation of memory contents of a remote control device as configured in accordance with an embodiment of the invention.

As already mentioned, the programmable logic 11 has access to memory 12. Depending upon the embodiment, the memory 12 may contain one or more pre-existing application programs. For example, with momentary reference to FIG. 2, a given illustrative memory 12 might include four pre-existing application programs 21 through 24. This memory 12 may also include one or more storage portions 25 that are available to retain a subsequently downloaded application program. It will be understood that these pre-existing application programs (and/or the downloaded application programs) comprise, at least in part, information that the programmable logic 11 can use to then selectively control the radio frequency transmitter 13 to compatibly transmit access requests to a given primary barrier control mechanism. Such information can include, but is not limited to, information regarding a given carrier frequency ($CF_1$) and/or modulation type ($MT_1$) 26 for a given pre-existing application program (such as program "1" 21), protocol specifications for communicating compatibly and successfully with the corresponding primary barrier control mechanism, authorization protocols and/or data or information and the like (while four pre-existing application programs are illustrated, and one open storage area for retaining an additional downloaded application program, it should be understood that such relative proportions serve an illustrative purpose only, and that any given embodiment can have as many of either and/or exclude one or the other as appropriate).

So configured, the programmable logic 11, upon accessing the memory 12 and retrieving the necessary operating information, can thereafter effect compatible remote control operations with a wide variety of primary barrier control mechanisms. To the extent that the memory 12 already retains a given application program that is compatible with a target primary barrier control mechanism, then only the correct program need be selected. In addition, or in the alternative, the necessary application program can be downloaded to the memory 12 when needed and then otherwise used as described.

In a preferred embodiment, it is via the external communication interface 14 that the programmable logic 11 determines which pre-existing application program to utilize and/or whether to accept and then use a new downloaded application program. The external communication interface 14 can comprise any (or many) of a wide variety of wired and wireless interfaces. For example, when the external communication interface 14 comprises a wired interface, the interface can comprise a direct computer interface (including but not limited to a Universal Serial Bus (USB) interface, a Firewire-compatible interface, an RS232-compatible interface, and/or a printer port interface, to name a few). Other wired interfaces that would serve appropriately in a given setting include telephone-style interfaces (including but not limited to RJ-11-compatible interfaces). When the external communications interface 14 comprises a wireless interface, again, a variety of known or hereafter developed approaches will work for these purposes. For example, a radio frequency interface (including but not limited to a Bluetooth-compatible interface, an 802.11-compatible interface, or a cellular telephony communication system-compatible interface) can be utilized in a variety of application settings. Other wireless options exist as well, including but not limited to light-based wireless interfaces (including visible light and infrared light-based technologies). It should also be understood that the external communications interface 14 can include a multiplicity of the above and/or virtually any other communication mechanism that may be appropriate to a given application. For example this interface could include a microphone and/or a modem to accommodate, for example, audible data streams (as can be provided via a standard telephone line in accordance with well-understood prior art practice).

So configured, the remote control device 10 can receive a signal from external the remote control device 10 via the external communications interface 14. That signal (either as received and/or as otherwise decoded and translated by the external communications interface 14) is then passed on to the programmable logic 11. When that signal comprises a pre-existing application programming selection command signaling input, the signal is used by the programmable logic 11 to select at least a part of at least one particular application program as is already available to the programmable logic 11 for subsequent use by the programmable logic 11 to control provision of corresponding remote control signaling via the remote control signaling output to the radio frequency transmitter 13. When that signal comprises application programming signaling input, the corresponding downloaded application program is then subsequently used by the programmable logic 11 to again control provision of corresponding remote control signaling via the remote control signaling output to the radio frequency transmitter 13. (As an alternative, of course, a newly downloaded application program could simply be retained in memory. So configured, a later received pre-existing application programming selection command signal as otherwise referenced above could be used to specify that particular downloaded application program for subsequent use as otherwise described.)

As alluded to earlier, the programmable logic 11 can also receive access system authentication information from the external communications interface 14. Such information can comprise, for example, authentication information comprising an at least partially unique alphanumeric sequence (as is needed, for example, when a given primary barrier control mechanism requires that an access request from a remote control device include with its transmission a specific authentication code). So configured, a remote control device

10 can be caused to select a specific application program to ensure compatible operation with a specific corresponding primary barrier control mechanism and to further use specific provided authentication information to ensure that the communications of the remote control device 10 are accepted by the primary barrier control mechanism.

So configured, a remote display (not shown) can be readily utilized in conjunction with the remote control device 10 when effecting such programming selections and/or downloads. For example, when the external communications interface 14 comprises a direct computer connection, an application running on the computer can provide a helpful graphic display to aid and direct the user to properly configure the remote control device 14. As a result, significant programming flexibility can be provided notwithstanding a relative paucity of resident display and control capacity for a given remote control device 10. As another example, when the remote control device 10 couples to the Internet via the external communications interface 14 (either in wired or wireless fashion as the case may be and as understood in the art), a relevant website (or other suitable network resource) can be utilized to effect the desired configuration of the remote control device 10. For example, a given manufacturer could maintain a website regarding its primary barrier control mechanisms. A consumer could then access that website with their remote control device and download and/otherwise select the appropriate application program to assure compatible operation with the manufacturer's offerings. So configured, the consumer would be able to interact with the website in a standard and familiar fashion and could effect the configuration process in a highly intuitive and friendly fashion. For example, the consumer could select a particular model of primary barrier control mechanism as may be displayed at the website to identify the mechanism for which compatible operation is desired. Upon selecting the mechanism in this relatively easy and non-technically challenging fashion, the website could then communicate accordingly with the remote control device 10 to effect the desired configuration (again, either by selecting a pre-existing capability already resident in the remote control device or by downloading the necessary information to the remote control device (or, of course, by some combination of both options, as where an update can be downloaded to permit a pre-existing application program to now work compatibly with a given primary barrier control mechanism).

In the alternative, or in combination therewith, the remote control device 10 itself can include an integral display 17 and/or a user interface 18 such as, for example, a more complex keypad. The display 17 can be virtually any known or hereafter developed display. In a preferred embodiment the display 17 comprises a multi-line multi-character alphanumeric display as well understood in the art.

Figure 3:
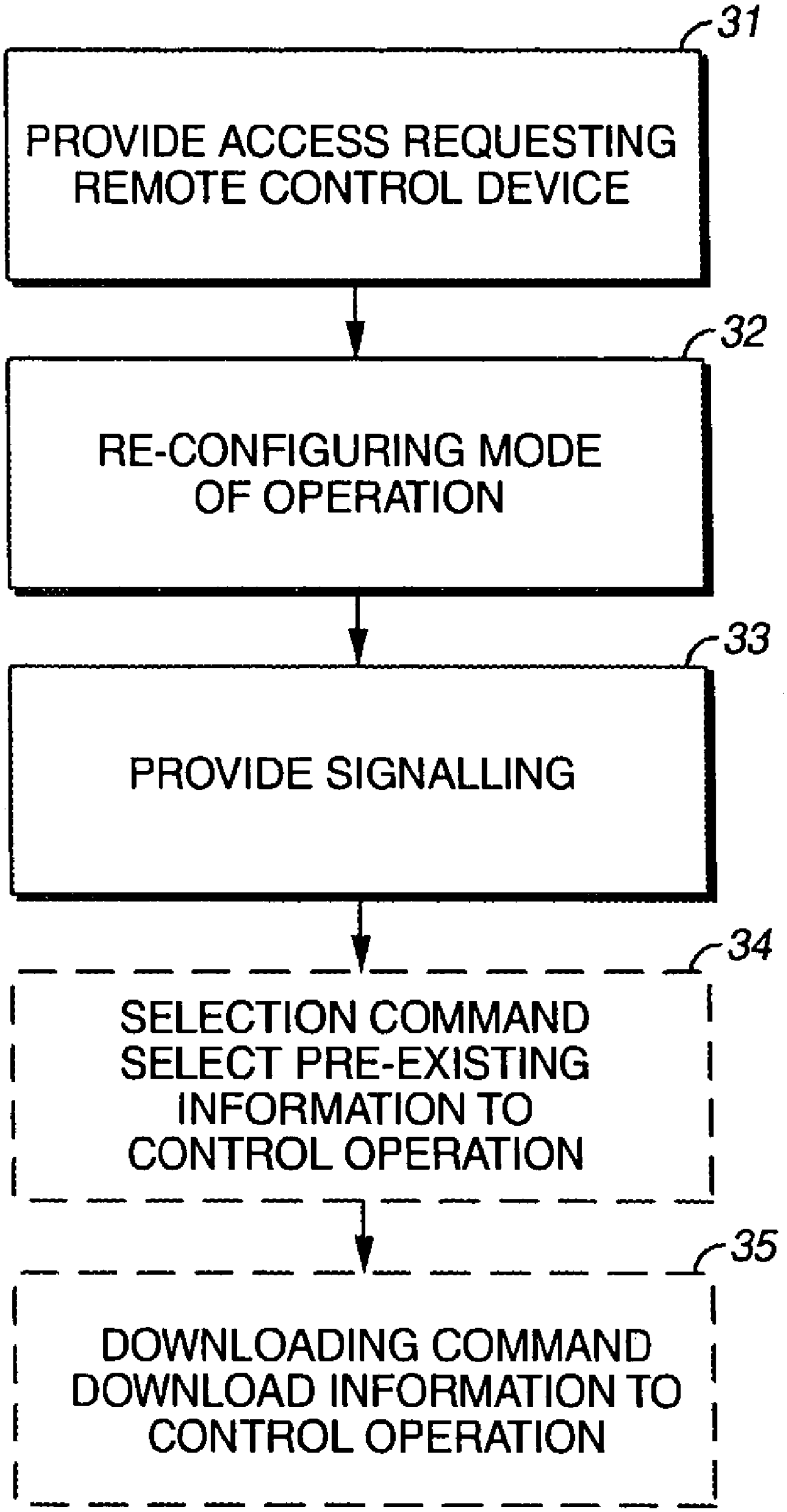
FIG. 3 comprises a flow diagram as configured in accordance with an embodiment of the invention.

The above described platforms serve well to embody the various processes described. In particular, and with reference now to FIG. 3, upon providing 31 an access requesting remote control device and placing 32 that device into a re-configuration mode of operation, the remote control device can be provided 33 with signaling such as a selection command and/or application programming as described earlier. As also described earlier, such signaling can be provided to the remote control device via the external communications interface using any of a variety of candidate carrier mechanisms. With proper configuration, when that signaling comprises a selection command, the process causes the remote control device to select 34 from amongst pre-existing information to thereafter control operation of the remote control device in conjunction with the corresponding primary barrier control mechanism. Again with proper configuration, when that signaling comprises a downloading command, the process causes the remote control device to download 35 programming information that may be subsequently used to control operation of the remote control device in conjunction with the corresponding primary barrier control mechanism.

So configured, an access requesting remote control device can be used effectively and compatibly with virtually any make or model of primary barrier control mechanism, including mechanisms not yet fielded at the time of releasing the remote control device. What is more, such flexibility can be accommodated in a relatively simple and intuitive fashion. The target primary barrier control mechanism can be identified in a variety of simple ways by even a relatively untrained user, following which the remote control device can be configured accordingly with little else to be done by the user. It should be clear, of course, that such a device could be reconfigured a number of times during its useful life, with each such instance being no more difficult or challenging than any other.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

I claim:

1. A radio frequency remote control device to request access to an area comprising:

a radio frequency transmitter that is compatible for use with a plurality of different transmission frequencies and modulation types;

an external communications interface;

programmable logic having:

a remote control signaling output operably coupled to the radio frequency transmitter; and a signaling input that is operably coupled to the external communications interface and wherein the signaling input comprises:

a pre-existing application programming selection command signaling input; and an application programming signaling input;

wherein the programmable logic is operated such that:

when the signaling input comprises the pre-existing application programming selection command signaling input, command selection of at least part of at least one particular pre-existing application program from amongst a plurality of pre-existing application program candidates, wherein at least two of the plurality of pre-existing application program candidates have differing transmission frequencies and modulation types, as are currently available in the access requesting remote control device as a function of signaling as is received at the signaling input to control provision of corresponding remote control signaling via the remote control signaling output;

when the signaling input comprises the application programming signaling input, command use of at least part of an application program as is downloaded thereat, which application program specifies a particular transmission frequency and modulation type from amongst the plurality of different transmission frequencies and modulation types with which the radio frequency transmitter is compatible to control provision of corresponding remote control signaling via the remote control signaling output;

wherein access to the area is requested via the remote control signaling output.

2. The radio frequency remote control device of claim 1 wherein the downloaded application comprises executable instructions that configure the programmable logic in conformance with a particular corresponding movable barrier operator system.

3. The radio frequency remote control device of claim 1 wherein the downloaded application comprises communications protocol information that enables the programmable logic to communicate compatibly via the radio frequency transmitter with a particular corresponding movable barrier operator system.

4. The radio frequency remote control device of claim 1 wherein the programmable logic has a signaling input further comprised of at least one of:

the pre-existing application programming selection command signaling input;

the application programming signaling input; and an access system authentication information input.

5. The radio frequency remote control device of claim 4 wherein the access system authentication information comprises an at least partially unique alphanumeric sequence.

6. The radio frequency remote control device of claim 1 wherein the external communications interface comprises a wired external interface.

7. The radio frequency remote control device of claim 6 wherein the wired external interface comprises a direct computer interface.

8. The radio frequency remote control device of claim 7 wherein the direct computer interface comprises at least one of:

a Universal Serial Bus (USB) interface;

a Firewire-compatible interface;

an RS232-compatible interface;

a printer port interface.

9. The radio frequency remote control device of claim 6 wherein the wired external interface comprises a telephone-style interface.

10. The radio frequency remote control device of claim 9 wherein the telephone-style interface comprises an RJ-11 compatible interface.

11. The radio frequency remote control device of claim 1 wherein the external communications interface comprises a wireless external interface.

12. The radio frequency remote control device of claim 11 wherein the wireless external interface comprises a radio frequency wireless external interface.

13. The radio frequency remote control device of claim 12 wherein the radio frequency wireless external interface comprises at least one of:

a Bluetooth-compatible external interface;

an 802.11-compatible external interface; and a cellular telephony communication system-compatible external interface.

14. The radio frequency remote control device of claim 11 wherein the wireless external interface comprises a light-based wireless external interface.

15. The radio frequency remote control device of claim 14 wherein the light-based wireless external interface comprises an infrared light-based wireless external interface.

16. The radio frequency remote control device of claim 14 wherein the light-based wireless external interface comprises a visible light-based wireless external interface.

17. The radio frequency remote control device of claim 1 and further comprising a display operably coupled to the programmable logic.

18. The radio frequency remote control device of claim 17 wherein the display comprises an alphanumeric display.

19. The radio frequency remote control device of claim 18 wherein the alphanumeric display comprises a multi-character alphanumeric display.

20. The radio frequency remote control device of claim 19 wherein the multi-character alphanumeric display comprises a multi-line multi-character alphanumeric display.

21. The radio frequency remote control device of claim 17 and further comprising a user interface operably coupled to the programmable logic.

22. A method comprising:

providing an access requesting remote control device that is selectively capable of using a plurality of different transmission frequencies and modulation types to transmit an access request;

placing the access requesting remote control device into a re-configuration mode of operation;

providing to the access requesting remote control device, via an external communications interface, signaling comprising:

a selection command that selects at least a portion of a pre-existing programming application from amongst a plurality of candidate programming applications as are available at the access requesting remote control device, wherein at least two of the plurality of candidate programming applications specify different radio frequency transmission frequencies and modulation types from one another; and application programming that specifies at least one particular one of each of the plurality of different transmission frequencies and modulation types;

wherein responding to provision of the selection command by using the selected pre-existing programming application to thereafter control operation of the access requesting remote control device when requesting access to an area;

responding to provision of the application programming, by using the application programming to thereafter control operation of the access requesting remote control device when requesting access to an area.

23. The method of claim 22 wherein providing the signaling via an external communications interface comprises providing audible signaling via an external communications interface.

24. The method of claim 23 wherein providing audible signaling via the external communications interface comprises providing audible signaling via a microphone.

25. The method of claim 23 wherein providing audible signaling via the external communications interface comprises providing audible signaling via a wired interface.

26. The method of claim 22 wherein providing the signaling via an external communication interface comprises providing the signaling via a wireless external communications interface.

27. The method of claim 22 wherein providing the signaling via an external communication interface comprises providing the signaling via a wireless radio frequency communications interface.

28. The method of claim 27 wherein providing the signaling via a wireless radio frequency communications interface comprises providing the signaling via a wireless telephony communications interface.

29. The method of claim 22 wherein providing the signaling via an external communication interface comprises providing the signaling via a wireless light-based communications interface.

30. The method of claim 29 wherein providing the signaling via a wireless light-based communications interface comprises providing the signaling via infrared light-based communications interface.

31. The method of claim 29 wherein providing the signaling via a wireless light-based communications interface comprises providing the signaling via a visible light-based communications interface.

32. The method of claim 22 and further comprising:

providing identification information to a movable barrier system via the access requesting remote control device.

33. The method of claim 32 wherein providing identification information to a movable barrier system via the access requesting remote control device includes receiving at least some of the identification information via the external communications interface.

34. The method of claim 32 wherein providing identification information to a movable barrier system via the access requesting remote control device includes providing an alphanumeric sequence that is substantially unique to the movable barrier controller remote control device.

* * * * *